United States Patent Office.

ROBERT A. CHESEBROUGH, OF NEW YORK, N. Y.

Letters Patent No. 77,959, dated May 19, 1868.

---

IMPROVED LUBRICATING-OIL.

---

The Schedule referred to in these Letters Patent and making part of the same.

---

TO ALL WHOM IT MAY CONCERN:

Be it known that whereas I, ROBERT A. CHESEBROUGH, of the city, county, and State of New York, did, on the twenty-second day of August, 1865, obtain Letters Patent of the United States for purifying petroleum or coal-oil by filtration through bone-black; and whereas one of the products resulting from the process is a lubricating-oil, of fine quality, obtained by filtering crude oil through bone-black, without previous distillation; now, therefore, the object of the present application is to more fully describe and particularize the said product, and to claim Letters Patent for the same as a new and useful article of manufacture; and I do hereby declare that the following is a full, clear, and exact description thereof.

The material I use to manufacture into a refined lubricating-oil, is the heavy crude oil or petroleum, produced principally in Western Virginia, possessing a gravity of about 26° to 33° Baumé's hydrometer. This oil, as it comes from the earth, has naturally good lubricating-properties, but it contains natural acids, grit, and impurities, which destroy machinery, and, in addition, its dark color and strong odor render it highly objectionable for mechanical or manufacturing purposes.

My process, patented as aforesaid, takes out the natural acids, grit, and impurities, and odor, and makes it lighter in color, and produces a product or oil of fine quality for lubricating-purposes suitable for all kinds of machinery, and applicable, also, to other uses, as, for instance, to oiling wool, or to saturating rope in rope-making.

The color of the product varies from a light straw, as it first comes from the filter, to a deep claret at the end of the operation.

My present mode of producing the oil or product which I here claim as my invention, is by filtering heavy crude oil according to the process secured to me in my Letters Patent, No. 49,502, granted to me the twenty-second day of August, 1865, preferring to use in the process a heated filter, as described in my Letters Patent, No. 49,230, and preferring, also, to use bone-black prepared according to my Letters Patent, No. 56,179, although I do not wish to confine myself to this exact method.

The product of the filtration is a new article of oil, which I call Filtrene, and which is of a superior quality as a lubricator, and for other purposes, and will stand a greater degree of cold than animal or fish-oils, contains no gum, and works clean and bright on machinery. The specific gravity of filtrene varies, in ordinary cases, from 26° Baumé to 35° Baumé, according to the different purposes to which it may be applied.

The present method of refining petroleum is by distillation, but if distillation be applied to the refining of heavy petroleum, its lubricating-qualities are injured by reason of the high heat required to vaporize it; but in the new article or product, produced as aforesaid, by filtration, the valuable lubricating-qualities of the crude petroleum are retained in an improved state.

What I claim as new, and desire to secure by Letters Patent, is—

The product or article called by me Filtrene, as a new article of manufacture.

ROBT. A. CHESEBROUGH.

Witnesses:
   D. B. CHILDS,
   J. VAN SANTVOORD.